United States Patent
Harris et al.

(10) Patent No.: US 7,438,229 B1
(45) Date of Patent: *Oct. 21, 2008

(54) COMBINED MAGNETIC SHIELD MEMBER AND PRESSURE PAD FOR A MAGNETIC READER

(75) Inventors: Richard H. Harris, Raleigh, NC (US); Robert A. Myers, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/117,246

(22) Filed: May 8, 2008

Related U.S. Application Data

(63) Continuation of application No. 11/934,423, filed on Nov. 2, 2007, now Pat. No. 7,383,993.

(51) Int. Cl.
*G06K 7/08* (2006.01)
*G11B 5/52* (2006.01)
*G11B 21/04* (2006.01)
*G11B 21/18* (2006.01)

(52) U.S. Cl. ............... 235/449; 360/281.6; 360/319
(58) Field of Classification Search ............ 235/439, 235/449; 360/281.6, 319; 382/139
See application file for complete search history.

(56) References Cited

U.S. PATENT DOCUMENTS

| | | | |
|---|---|---|---|
| 4,839,959 | A | 6/1989 | Mersing |
| 5,893,667 | A | 4/1999 | Kinney et al. |
| 6,229,965 | B1 | 5/2001 | Ito et al. |
| 6,279,827 | B1 | 8/2001 | Yeckley |
| 6,378,773 | B1 | 4/2002 | Sanchez et al. |
| 6,394,348 | B1 | 5/2002 | Tratar et al. |
| 6,980,403 | B2 | 12/2005 | Hasegawa |
| 7,383,993 | B1 * | 6/2008 | Harris et al. ............ 235/449 |
| 2001/0001471 | A1 | 5/2001 | Momose |

* cited by examiner

*Primary Examiner*—Jared J Fureman
(74) *Attorney, Agent, or Firm*—Cantor Colburn LLP; Jason O. Piche

(57) ABSTRACT

A magnetic shield member for a device with a magnetic reader, the magnetic shield member includes a biasing member including a first end, a second end opposite to the first end and an intermediate portion disposed between the first and second ends, the first end configured to be attached within the device with a magnetic reader, the second end configured to face the magnetic reader and a shielding member including a first end, a second end opposite to the first end and an arched portion disposed between the first end and the second end, wherein the first end of the shielding member extends integrally from the second end of the biasing member, the arched portion includes a concave portion which faces the magnetic reader, wherein the shielding member applies a force to conform a document against the magnetic reader and shields the magnetic reader from magnetic interference.

1 Claim, 4 Drawing Sheets

COMBINED MAGNETIC SHIELD MEMBER AND PRESSURE PAD FOR A MAGNETIC READER

CROSS REFERENCE TO RELATED APPLICATIONS

This application is a continuation of U.S. patent application Ser. No. 11/934,423, filed Nov. 2, 2007, now U.S. Pat. No. 7,383,993, the contents of which are incorporated herein by reference thereto.

BACKGROUND OF THE INVENTION

1. Field of the Invention

This invention relates generally to a magnetic shield member, and more particularly, to a combined magnetic shield member and pressure pad for a magnetic reader.

2. Description of the Background

Face-to-face retail sales transactions take place at a point of sale ("POS") or what is commonly referred to as a checkout line or a counter. In this case, a customer typically purchases goods by either cash, check, charge or debit card.

To effectuate a sales transaction, many retailers presently use a POS system to facilitate and provide a record of the sales transactions. Such a POS system may include a scanner for reading coded product price, a terminal for manual entry of transaction information and storage of currency and a printer which may be used to produce a documentary record or journal for the business and a printed receipt for the customer.

In addition, the POS system may include a check processing system to facilitate the sales transaction when a check is used for payment. The check processing system includes a magnetic ink character recognition ("MICR") reader for reading magnetic information stored in magnetic ink printed on a front side of checks or other documents. However, in order to generate a strong magnetic signal which is required to accurately read the magnetic information from the checks or other documents, the checks and other documents must be kept in close contact with the MICR reader. Therefore, a pressure pad which applies a force onto a backside of the checks or other documents has been previously developed in order to keep the checks or other documents in close contact with the MICR reader.

However, check processing systems including the MICR reader can be affected by magnetic interference generated from external and internal sources. That is, external sources, such as display devices and scanners, and internal sources, such as paper feed motors, print heads and solenoids, generate magnetic fields which result in magnetic interference relative to the magnetic information stored within the magnetic ink portion of the checks or other documents. The magnetic interference prevents the MICR reader from accurately reading the magnetic information stored on the checks or other documents. Nonetheless, in order produce a low-cost and high throughput printer, the MICR reader must be positioned as close as possible to other components within the printer, including the paper feed motors and the print head.

One of the methods used to overcome this problem with magnetic interference has been to surround the MICR reader and pressure pad with a high permeability shielding material, including a nickel alloy such as Mu-Metal™ or Permalloy™, to thereby shield the MICR reader from magnetic interference. However, this method significantly increases a manufacturing cost of the printer since the high permeability shielding material is expensive and a large volume thereof is required in order to surround the MICR reader and pressure pad. In addition, due to the large amount of material volume and the proximity to other components within the printer, the high permeability shielding material can cause additional problems, such as overheating.

Therefore, in order to reduce the effect of magnetic interference on the MICR reader, minimize an overheating of the printer and reduce a manufacturing cost of the printer, a magnetic interference shield which uses a minimum amount of material volume is desirable.

SUMMARY OF THE INVENTION

The shortcomings of the prior art are overcome and additional advantages are provided by a point of sale (POS) device including a magnetic reader, which is configured to read magnetically recorded data from a document inserted therein, and a magnetic shield member including a biasing member including a first end configured to be attached to the magnetic reader within the POS device, a second end opposite to the first end and being configured to face the magnetic reader, and an intermediate portion disposed between the first and second ends to form a first obtuse angle between the intermediate portion and the first end and a second obtuse angle between the intermediate portion and the second end, and a shielding member including a first end, which extends integrally from the second end of the biasing member, a second end opposite to the first end and an arched portion which is disposed between the first end and the second end, which integrally connects the first end of the shielding member with the second end of the shielding member, and which includes a concave portion that faces the magnetic reader, wherein the shielding member applies a force on the magnetic reader and shields the magnetic reader from magnetic interference.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF SPECIFIC EMBODIMENTS

The present invention will be described with respect to a point-of-sale ("POS") check reader having a magnetic ink character recognition ("MICR") reader. However, the present invention is also applicable to other types of magnetic readers including, but not limited to, magnetic tape heads, magnetic disks, or magnetic strip readers ("MSR") which operate in environments subject to magnetic interference.

Figure 1:
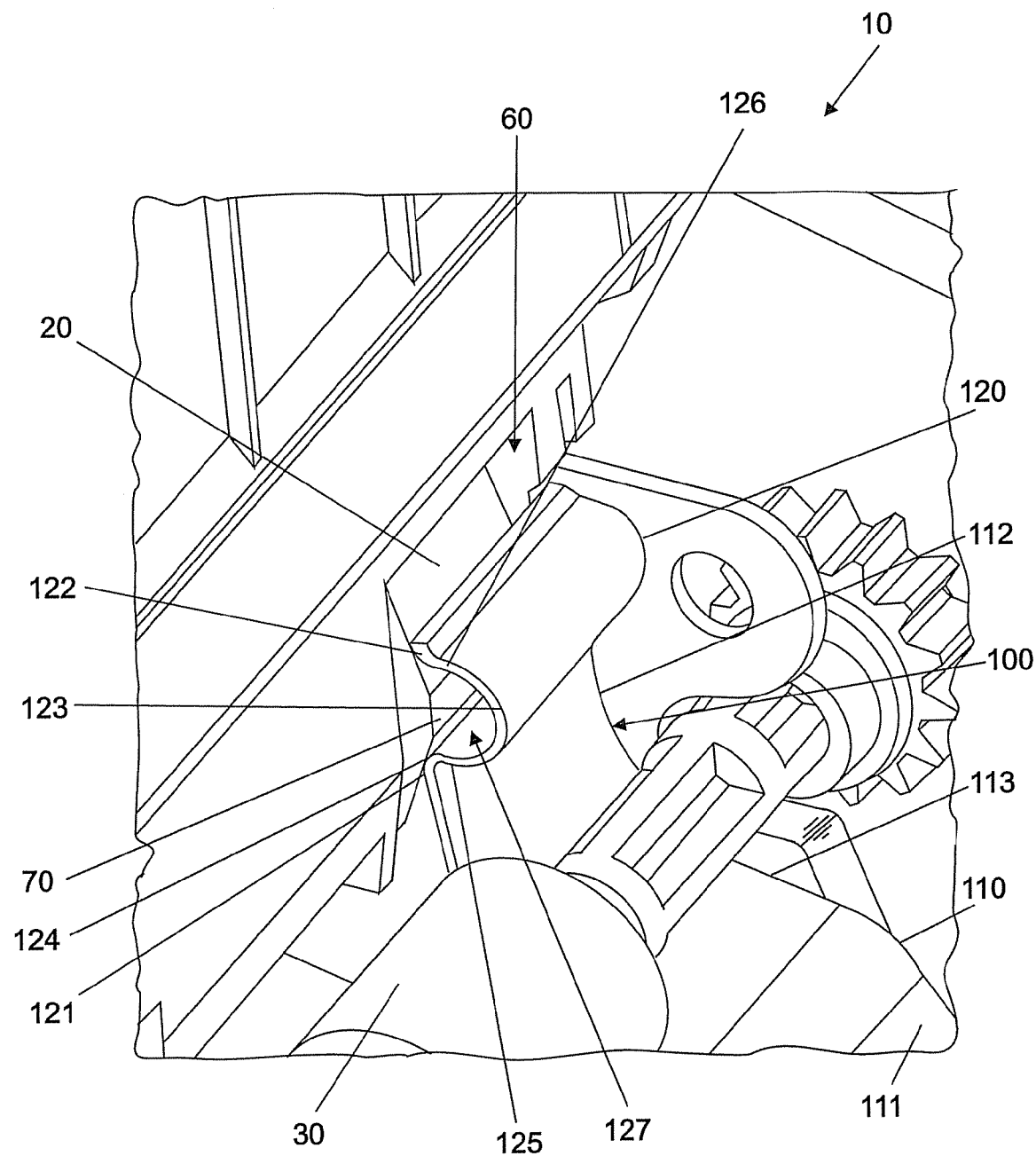
FIG. 1 is a partial front perspective schematic drawing illustrating a device having an exemplary embodiment of a magnetic shield member in accordance with the present invention.
Figure 2:
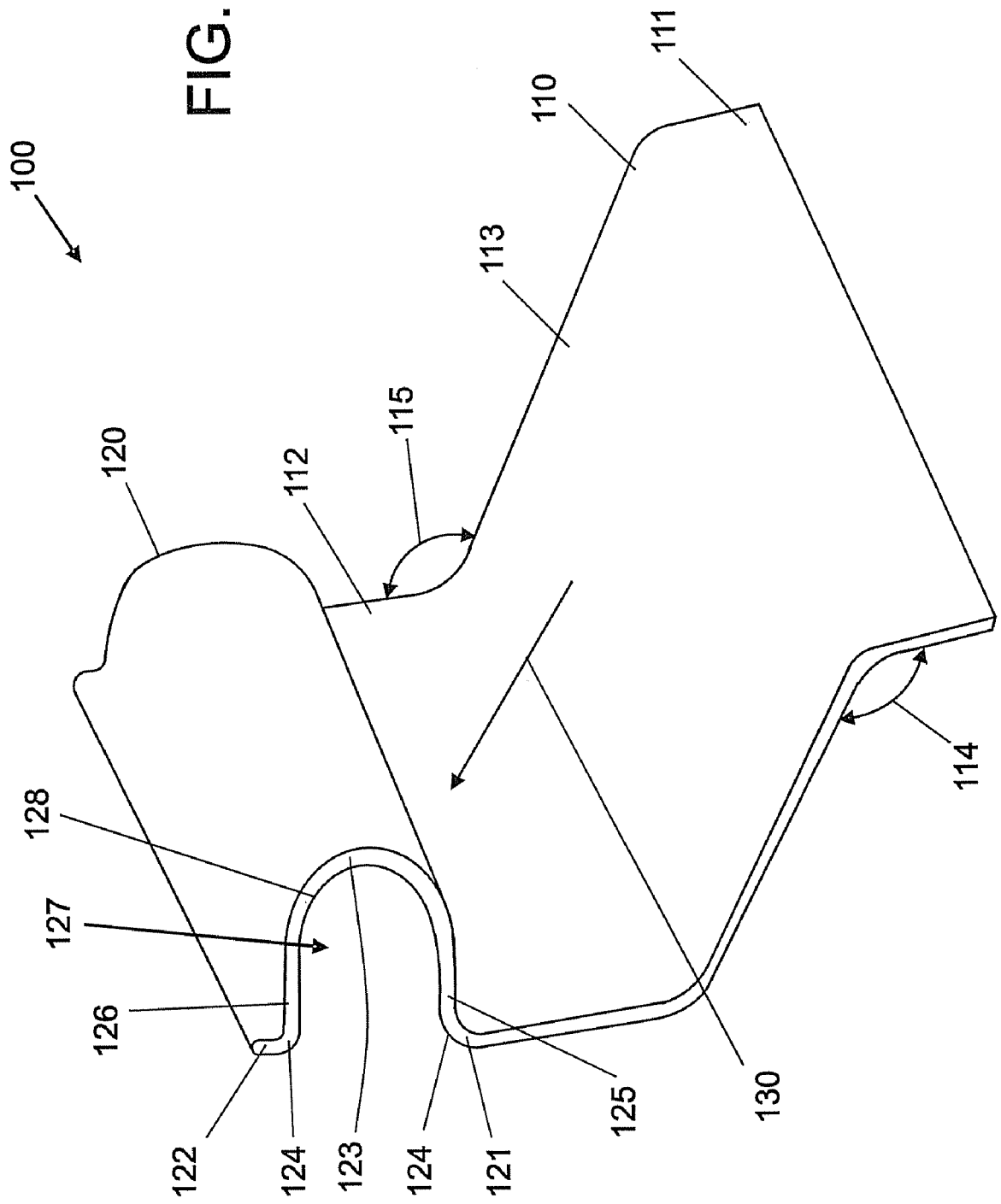
FIG. 2 is a front perspective schematic drawing of the exemplary embodiment of a magnetic shield member as illustrated in FIG. 1.

FIG. 1 is a partial front perspective schematic drawing illustrating a device having an exemplary embodiment of a magnetic shield member 100 in accordance with the present invention. FIG. 2 is a front perspective schematic drawing of the exemplary embodiment of a magnetic shield member 100, as illustrated in FIG. 1.

Figure 3:
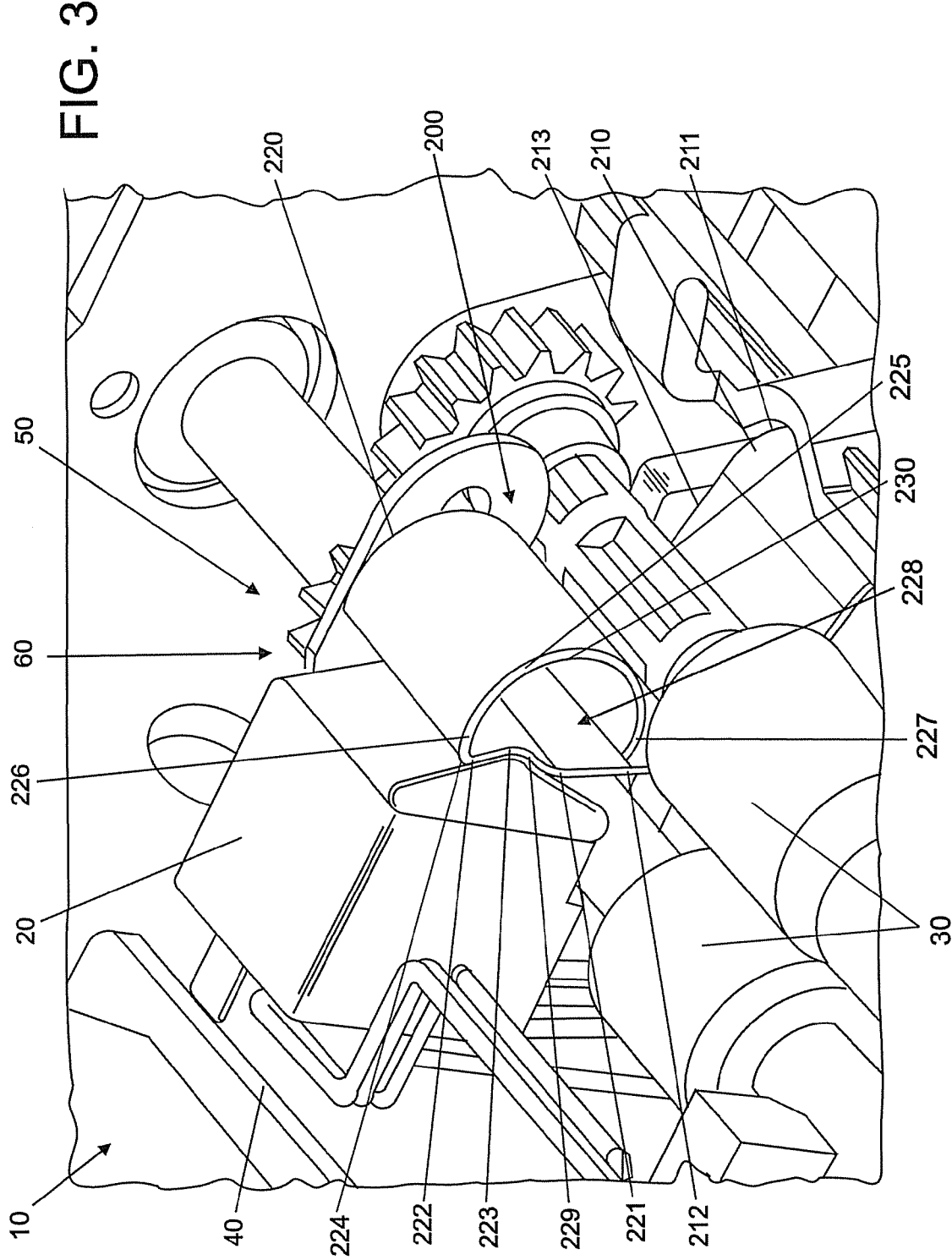
FIG. 3 is a partial front perspective schematic drawing illustrating a device having another exemplary embodiment of a magnetic shield member in accordance with the present invention.
Figure 4:
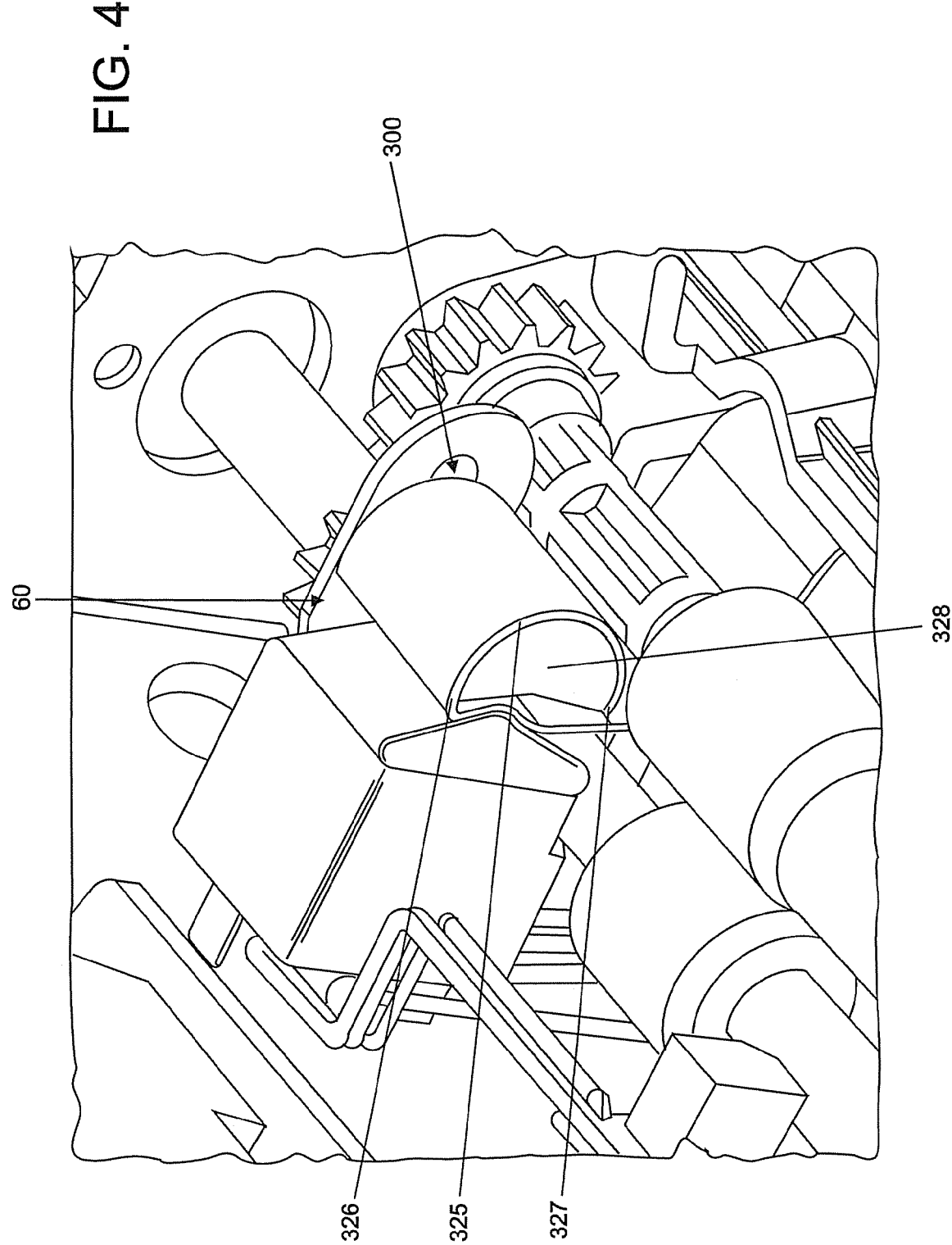
FIG. 4 is a partial front perspective schematic drawing illustrating a device having another exemplary embodiment of a magnetic shield member in accordance with the present invention.

FIG. 3 is a partial front perspective schematic drawing illustrating a device having another exemplary embodiment of a magnetic shield member 200 in accordance with the present invention and FIG. 4 is a partial front perspective schematic drawing illustrating a device having another exemplary embodiment of a magnetic shield member 300 in accordance with the present invention.

An exemplary embodiment of the magnetic shield member 100 in accordance with the present invention will now be described in conjunction with a POS check reader 10. As illustrated in FIG. 3, the POS check reader 10 includes a magnetic ink character recognition ("MICR") read head 20 and document feed rollers 30 which are contained within a housing 40. The POS check reader 10 further includes a document insertion region 50, through which documents, such as checks, are fed and received by the feed rollers 30. As best seen with reference to FIG. 3, the documents are fed via the feed rollers 30 in a direction along a document feed path 60. In exemplary embodiments, the feed rollers 30 are powered such that a feed velocity of the documents is controlled. Documents inserted within the document insertion region 50 are configured to travel along the document feed path 60 and in between an active region 70 (FIG. 1) of the MICR read head 20 and the magnetic shield member 100 (FIG. 1). The active region 70 of the MICR read head 20 is a thin linear gap extending substantially perpendicular to the direction of the document feed path 60 and parallel to an axis of each of the feed rollers 30.

Referring now to FIGS. 1 and 2, the magnetic shield member 100 includes a biasing member 110 and a shielding member 120. The biasing member 110 includes a first end 111, a second end 112 which is opposite to the first end 111 and an intermediate portion 113 disposed between the first and second ends 111 and 112. The first end 111 is configured to be attached within the POS check reader 10 and the second end 112 is configured to face the active region 70 of the MICR read head 20. In exemplary embodiments, the biasing member 110 includes a first angle 114 between the intermediate portion 113 and the first end 111 and a second angle 115 between the intermediate portion 113 and the second end 112. In an exemplary embodiment, the first and second angles 114 and 115 are obtuse, such that the intermediate portion 113 extends obliquely from the first and second ends 111 and 112 of the biasing member 110.

In exemplary embodiments, the shielding member 120 includes a first end 121, a second end 122 which is opposite to the first end 121 and an arched portion 123 which is disposed between the first and second ends 121 and 122. The arched portion 123, which includes a concave portion 128 which faces the MICR read head 20, integrally connects the first end 121 of the shielding member to the second end 122 of the shielding member. In exemplary embodiments, the shielding member 120 includes at least one pressure pad 124 integrally formed with the first and second ends 121 and 122 of the shielding member 120. In an exemplary embodiment, the pressure pad 124 includes a rounded portion configured to contact the MICR read head 20.

In the current exemplary embodiment, the shielding member 120 includes pressure pads 124 which are integrally formed on each first and second ends 121 and 122 of the shielding member 120. The rounded portions of the pressure pads 124 allow checks or other documents to easily pass between the pressure pads 124 and the MICR read head 20.

In exemplary embodiments, the pressure pads 124 are formed from a same material as the magnetic shield member 100, however the present invention is not limited thereto. That is, the pressure pad 124 may include any material conventionally known in the art which includes desired friction characteristics, such as a thermoplastic.

In exemplary embodiments, the arched portion 123 of the shielding member 120 may include a U-shape, a semi-circular shape or a partially cylindrical shape, however the present invention is not limited thereto. That is, in exemplary embodiments, the arched portion 123 of the shielding member 120 may include various other shapes in order to effectively shield the MICR read head 20 from magnetic interference.

As illustrated in FIGS. 1 and 2, in exemplary embodiments, the shielding member 120 includes at least two opposing sidewall portions 125 and 126 which are integrally connected to each other by the arched portion 123, thereby forming a cavity 127 therein. In exemplary embodiments, the sidewall portions 125 and 126 are substantially perpendicular with respect to the document feed path 60 and the MICR read head 20.

In further exemplary embodiments, the magnetic shield member 100 includes a width substantially similar to a width of the MICR read head 20, to thereby effectively shield the active region 70 of the MICR read head 20 from magnetic interference. In exemplary embodiments, the magnetic shield member 100 is fabricated from a high magnetic permeability material. In further exemplary embodiments, the magnetic shield member 100 is fabricated from a nickel-alloy sheet including Mu-Metal™ or Permalloy™.

In alternative exemplary embodiments, the shielding member 120 is fabricated from a nickel-alloy, including Mu-Metal™ or Permalloy™, and the biasing member 110 is fabricated from any material conventionally known in the art capable of providing a desired force onto the shielding member 120, such as a thermoplastic. In further alternative exemplary embodiments, the biasing member 110 and the shielding member 120 may be fabricated from different materials. That is, the first end 111, the second end 112 and the intermediate portion 113 of the biasing member 110 may be fabricated from different materials than the shielding member 120.

In the current exemplary embodiment, the biasing member 110 extends in a direction away from the shielding member 120 such that mounting the biasing member 110 within the housing 40 creates a biasing force which thereby forces the shielding member 120 in a direction toward the MICR read head 20. That is, the biasing member 110 is configured to bias the shielding member 120 in a direction substantially toward the MICR read head 20, such that the pressure pads 124 make contact with an area above and below the active region 70 of the MICR read head 20.

However, in alternative exemplary embodiments, the biasing member 110 is configured to function as a pivot, such that the shielding member 120 rotates with respect to the pivot and the pressure pads 124 of the shielding member 120 make contact with an area above and below the active region 70 of the MICR read head 20. Although not shown, the magnetic shield member 100 may include a separate force applying member (not shown), which is configured to apply a force 130 onto the shielding member 120.

Referring now to FIG. 3, another exemplary embodiment of a magnetic shield member 200 includes a biasing member 210 and a shielding member 220. The biasing member 210 includes a first end 211, a second end 212 which is opposite to the first end 211 and an intermediate portion 213 disposed between the first and second ends 211 and 212. The first end 211 is configured to be attached within the POS check reader 10 and the second end 212 is configured to face the active region 70 of the MICR read head 20. In exemplary embodiments, the biasing member 210 includes a first angle between the intermediate portion 213 and the first end 211 and a second angle between the intermediate portion 213 and the second end 212. In an exemplary embodiment, the first and second angles are obtuse, such that the intermediate portion 213 extends obliquely from the first and second ends 211 and 212 of the biasing member 210.

In exemplary embodiments, the shielding member 220 includes a first end 221, a second end 222 which is opposite to the first end 221 and an arched portion 223 which is disposed between the first and second ends 221 and 222. The arched portion 223, which includes a concave portion 229 which faces the MICR read head 20, integrally connects the first end 221 of the shielding member 220 to the second end 222 of the shielding member 220. In the current exemplary embodiment, as illustrated in FIG. 3, the arched portion 223 has a relatively shallow arch as compared to the arched portion 123 of the exemplary embodiment illustrated in FIGS. 1 and 2. That is, in the current exemplary embodiment, the arched portion 223 has a larger radius of curvature as compared with the previous exemplary embodiment, such that the concave portion 229 of the arched portion 223 is configured to be substantially adjacent to the MICR read head 20.

In exemplary embodiments, the shielding member 220 includes at least one pressure pad 224 integrally formed with the first and second ends 221 and 222 of the shielding member 220. In an exemplary embodiment, the pressure pad 224 includes a rounded portion configured to contact the MICR read head 20.

In the current exemplary embodiment, the shielding member 220 includes pressure pads 224 which are integrally formed on each first and second ends 221 and 222 of the shielding member 220. The rounded portions of the pressure pads 224 allow checks or other documents to easily pass between the pressure pads 224 and the MICR read head 20.

In exemplary embodiments, the pressure pads 224 are formed from a same material as the magnetic shield member 200, however the present invention is not limited thereto. That is, the pressure pad 224 may include any material conventionally known in the art which includes desired friction characteristics, such as a thermoplastic.

In exemplary embodiments, the arched portion 223 of the shielding member 220 may include a U-shape, a semi-circular shape or a partially cylindrical shape, however the present invention is not limited thereto. That is, in exemplary embodiments, the arched portion 223 of the shielding member 220 may include various other shapes in order to effectively shield the MICR read head 20 from magnetic interference.

In the current exemplary embodiment, as illustrated in FIG. 3, the shielding member 220 further includes a first sidewall portion 226 which extends from the second end 222 of the shielding member 220, a second sidewall portion 227 which opposes the first sidewall portion 226 and a shielding arch 225 which is disposed between the first and second sidewall portions 226 and 227. The shielding arch 225, which includes a concave portion 230 which faces a direction toward the MICR read head 20, integrally connects the first sidewall portion 226 to the second sidewall portion 227, thereby forming a cavity 228 therein. In exemplary embodiments, the sidewall portions 226 and 227 are substantially perpendicular with respect to the document feed path 60 and the MICR read head 20.

In exemplary embodiments, the shielding arch 225, as illustrated in FIG. 3, has a relatively larger arch as compared to the arched portion 223. That is, in the current exemplary embodiment, the arched portion 225 has a larger radius of curvature as compared with the arched portion 223. In exemplary embodiments, the first sidewall portion 226, the shielding arch 225 and the second sidewall portion 227 are integrally connected to the second end 212 of the biasing member 210. However, in alternative exemplary embodiments, the second sidewall portion 227 may be separated from the biasing member 210.

In exemplary embodiments, the shielding arch 225 may include a U-shape, a semi-circular shape or a partially cylindrical shape in order to shield the MICR read head 20 from magnetic interference. However, the shielding arch 225 of the present invention is not limited to thereto and may include various other shapes.

In further exemplary embodiments, the magnetic shield member 200 includes a width substantially similar to a width of the MICR read head 20, to thereby effectively shield the active region 70 of the MICR read head 20 from magnetic interference. In exemplary embodiments, the magnetic shield member 200 is fabricated from a high magnetic permeability material. In further exemplary embodiments, the magnetic shield member 200 is fabricated from a nickel-alloy sheet including Mu-Metal™ or Permalloy™.

In alternative exemplary embodiments, the shielding member 220 is fabricated from a nickel-alloy, including Mu-Metal™ or Permalloy™, and the biasing member 210 is fabricated from any material conventionally known in the art capable of providing a desired force onto the shielding member 220, such as a thermoplastic. In further alternative exemplary embodiments, the biasing member 210 and the shielding member 220 may be fabricated from different materials. That is, the first end 211, the second end 212 and the intermediate portion 213 of the biasing member 110 may be fabricated from different materials than the shielding member 220.

In the current exemplary embodiment, the biasing member 210 extends in a direction away from the shielding member 220 such that mounting the biasing member 210 within the housing 40 creates a biasing force which thereby forces the shielding member 220 in a direction toward the MICR read head 20. That is, the biasing member 210 is configured to bias the shielding member 120 in a direction substantially toward the MICR read head 20, such that the pressure pads 224 make contact with an area above and below the active region 70 of the MICR read head 20.

However, in alternative exemplary embodiments, the biasing member 210 is configured to function as a pivot, such that the shielding member 220 rotates with respect to the pivot, and the pressure pads 224 of the shielding member 220 make contact with an area above and below the active region 70 of the MICR read head 20. Although not shown, the magnetic shield member 200 may include a separate force applying member (not shown), which is configured to apply a force onto the shielding member 220.

Referring now to FIG. 4, yet another exemplary embodiment of a magnetic shield member 300 is illustrated. The magnetic shield member 300 is substantially similar to the exemplary embodiment illustrated in FIG. 3, but further includes at least one shielding sidewall 328 which encloses a corresponding end portion of a cavity (not shown) which is defined by sidewalls 326 and 327 and a shielding arch 325. In exemplary embodiments, the cavity is filled with a filling material including a high magnetic permeability material. In further exemplary embodiments, the filling material may include a nickel-alloy, such as Mu-Metal™ or Permalloy™.

An exemplary embodiment of the present invention combines a magnetic interference shielding function and a pressure pad function into a single part, to thereby ensure that material volume and therefore material costs and manufacturing costs associated therewith are reduced.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A point of sale (POS) device, comprising:
  a magnetic reader, which is configured to read magnetically recorded data from a document inserted therein; and
  a magnetic shield member including:
    a biasing member including a first end configured to be attached to the magnetic reader within the POS device, a second end opposite to the first end and being configured to face the magnetic reader, and an intermediate portion disposed between the first and second ends to form a first obtuse angle between the intermediate portion and the first end and a second obtuse angle between the intermediate portion and the second end, and
    a shielding member including a first end, which extends integrally from the second end of the biasing member, a second end opposite to the first end and an arched portion which is disposed between the first end and the second end, which integrally connects the first end of the shielding member with the second end of the shielding member, and which includes a concave portion that faces the magnetic reader, wherein
  the shielding member applies a force on the magnetic reader and shields the magnetic reader from magnetic interference.

* * * * *